(12) United States Patent
Eddelson et al.

(10) Patent No.: US 12,250,278 B1
(45) Date of Patent: Mar. 11, 2025

(54) SYSTEMS AND METHODS FOR LOCATION BASED NETWORKING

(71) Applicants: Brian Eddelson, Garden City, NY (US); Jake Cameron, Farmingdale, NY (US)

(72) Inventors: Brian Eddelson, Garden City, NY (US); Jake Cameron, Farmingdale, NY (US)

(*) Notice: Subject to any disclaimer, the term of this patent is extended or adjusted under 35 U.S.C. 154(b) by 0 days.

(21) Appl. No.: 18/902,476

(22) Filed: Sep. 30, 2024

Related U.S. Application Data

(60) Provisional application No. 63/661,622, filed on Jun. 19, 2024.

(51) Int. Cl.
| | |
|---|---|
| *G06F 15/16* | (2006.01) |
| *G06F 3/0488* | (2022.01) |
| *H04L 67/51* | (2022.01) |
| *H04L 67/52* | (2022.01) |

(52) U.S. Cl.
CPC ............ *H04L 67/51* (2022.05); *G06F 3/0488* (2013.01); *H04L 67/52* (2022.05)

(58) Field of Classification Search
CPC ........ H04L 67/51; H04L 67/52; G06F 3/0488
USPC ....................................................... 709/203
See application file for complete search history.

(56) References Cited

U.S. PATENT DOCUMENTS

| | | | | |
|---|---|---|---|---|
| 2014/0228062 | A1* | 8/2014 | Rubowitz | H04W 52/0277 455/466 |
| 2015/0171926 | A1* | 6/2015 | Coelho | H04B 5/70 455/41.2 |
| 2016/0005003 | A1* | 1/2016 | Norris | H04L 65/403 455/456.3 |

* cited by examiner

*Primary Examiner* — Alan S Chou
(74) *Attorney, Agent, or Firm* — Shore IP Group, PLLC; Sean R. Wilsusen

(57) ABSTRACT

A system for location and degree of separation based networking is presented. A geographic location of a first user device is accessed. One or more contacts on the first user device are accessed. A predetermined radius around the geographic location for one or more second user devices is scanned. It is determined that the one or more second user devices within the predetermined radius include a contact that is on the user device. The system displays, on a GUI, a representation of the geographic location and the one or more second user devices. The system receives a touch gesture indicating a selection of a selected user device. Information is displayed relating to the selected user device. The system transmits to the selected user device a notification indicating an introduction of the user and causes the selected user device to display the introduction.

20 Claims, 10 Drawing Sheets

SYSTEMS AND METHODS FOR LOCATION BASED NETWORKING

CROSS-REFERENCE TO RELATED APPLICATION

The present non-provisional patent application claims priority to U.S. Provisional Patent Application No. 63/661,622, filed on Jun. 19, 2024, the entire contents of which are incorporated by reference herein.

FIELD

The present disclosure relates to a location based networking and, more particularly, to a device, system, and method for connecting people within the same geographical area with second degree connections.

BACKGROUND

Attempting to network without knowing anyone can be challenging due to the lack of established connections and trust. Without a starting point, it can be difficult to initiate conversations and gain access to valuable opportunities. This situation often requires more effort in cold outreach and finding alternative ways to engage with new contacts, such as attending events or joining relevant groups.

Therefore, there is a need for connecting people within the same geographical area with second degree connections.

SUMMARY

The present disclosure relates to a location based networking and, more particularly, to a device, system, and method for connecting people within the same geographical area with second degree connections.

Provided in accordance with aspects of the present disclosure is a system for location and degree of separation based networking. The system includes a processor and a memory. The memory includes instructions stored thereon, which, when executed by the processor, cause the system to access a geographic location of a first user device having an application for location and degree of separation based networking installed; and access one or more contacts on the first user device. The one or more contacts include contact information including phone numbers, email addresses, and/or one or more personal details. The instructions, when executed by the processor further cause the system to scan a predetermined radius around the geographic location for one or more second user devices, and determine that the one or more second user devices within the predetermined radius include a contact that is the one or more contacts on the user device. The instructions, when executed by the processor further cause the system to display on a graphical user interface a representation of the geographic location and the one or more second user devices based on the predetermined radius; receive a touch gesture indicating a selection of a selected user device of the one or more second user devices; display information relating to the selected user device in response to the touch gesture; and transmit to the selected user device a notification indicating an introduction of the user, causing the selected user device to display the introduction.

In an aspect of the present disclosure, the instructions, when executed by the processor, may further cause the system to filter one or more contacts to reduce an amount of contacts that may be used for the determination that the one or more second user devices within the predetermined radius include the contact. The filtering may be based on a user setting for filtering whether or not the user would like certain contacts to be used over others within application.

In an aspect of the present disclosure, the instructions, when executed by the processor, may further cause the system to store data gathered during the scanning and the determination within a database for use in providing recommendations.

In an aspect of the present disclosure, the instructions, when executed by the processor, may further cause the system to determine if the selected user device has the application installed and provide the notification by the installed application on the selected user device.

In an aspect of the present disclosure, the user of the first user device and a user of the selected device, different than the user of the first user device, may not know each other.

In an aspect of the present disclosure, the instructions, when executed by the processor, may further cause the system to determine that more than one contact is in common between the first user device and the one or more second user devices and display information on the graphical user interface based on the determination.

In an aspect of the present disclosure, the notification may include a push notification, a geographical grid highlighting location, and/or a text message.

In an aspect of the present disclosure, the scanning may be performed using GPS data, WIFI data, and/or Bluetooth data.

In an aspect of the present disclosure, the instructions, when executed by the processor, may further cause the system to: receive an acceptance of the invitation and initiate a chat session between the selected user device and the first user device based on the acceptance.

In an aspect of the present disclosure, one or more second user devices may not have the application installed.

Provided in accordance with aspects of the present disclosure is a computer-implemented method for location degree of separation based networking. The method includes accessing a geographic location of a first user device having an application for location and degree of separation based networking installed; accessing one or more contacts on the first user device, the one or more contacts include contact information, including at least one of phone numbers, email addresses, and/or one or more personal details; scanning a predetermined radius around the geographic location for one or more second user devices; determining that the one or more second user devices within the predetermined radius include a contact that is the one or more contacts on the user device; displaying on a graphical user interface a representation of the geographic location and the one or more second user devices based on the predetermined radius; receiving a touch gesture indicating a selection of a selected user device of the one or more second user devices; displaying information relating to the selected user device in response to the touch gesture; and transmitting to the selected user device a notification indicating an introduction of the user, causing the selected user device to display the introduction.

In an aspect of the present disclosure, the method may further include filtering one or more contacts to reduce an amount of contacts that may be used for the determination that the one or more second user devices within the predetermined radius include the contact. The filtering may be based on a user setting for filtering whether or not the user would like certain contacts to be used over others within application.

In an aspect of the present disclosure, the method may further include storing data gathered during the scanning and the determination within a database for use in providing recommendations.

In an aspect of the present disclosure, the method may further include determining if the selected user device has the application installed and providing the notification by the installed application on the selected user device.

In an aspect of the present disclosure, the user of the first user device and a user of the selected, device different than the user of the first user device, may not know each other.

In an aspect of the present disclosure, the method may further include determining that more than one contact is in common between the first user device and the one or more second user devices and displaying information on the graphical user interface based on the determination.

In an aspect of the present disclosure, the notification includes a push notification, a geographical grid highlighting location, and/or a text message.

In an aspect of the present disclosure, the method may further include the scanning may be performed using GPS data, WIFI data, and/or Bluetooth data.

In an aspect of the present disclosure, the method may further include receiving an acceptance of the invitation and initiating a chat session between the selected user device and the first user device based on the acceptance.

Provided in accordance with aspects of the present disclosure is a non-transitory computer readable medium, storing instructions for executing a computer-implemented method for location and degree of separation based networking. The method includes: accessing a geographic location of a first user device having an application for location and degree of separation based networking installed; accessing one or more contacts on the first user device, the one or more contacts include contact information, including phone numbers, email addresses, and/or one or more personal details; scanning a predetermined radius around the geographic location for one or more second user devices; determining that the one or more second user devices within the predetermined radius include a contact that is the one or more contacts on the user device; displaying on a graphical user interface a representation of the geographic location and the one or more second user devices based on the predetermined radius;

receiving a touch gesture indicating a selection of a selected user device of the one or more second user devices; displaying information relating to the selected user device in response to the touch gesture; and transmitting to the selected user device a notification indicating an introduction of the user, causing the selected user device to display the introduction.

BRIEF DESCRIPTION OF THE DRAWINGS

Various aspects and features of the present disclosure are described hereinbelow with reference to the drawings wherein.

DETAILED DESCRIPTION

Figure 1:
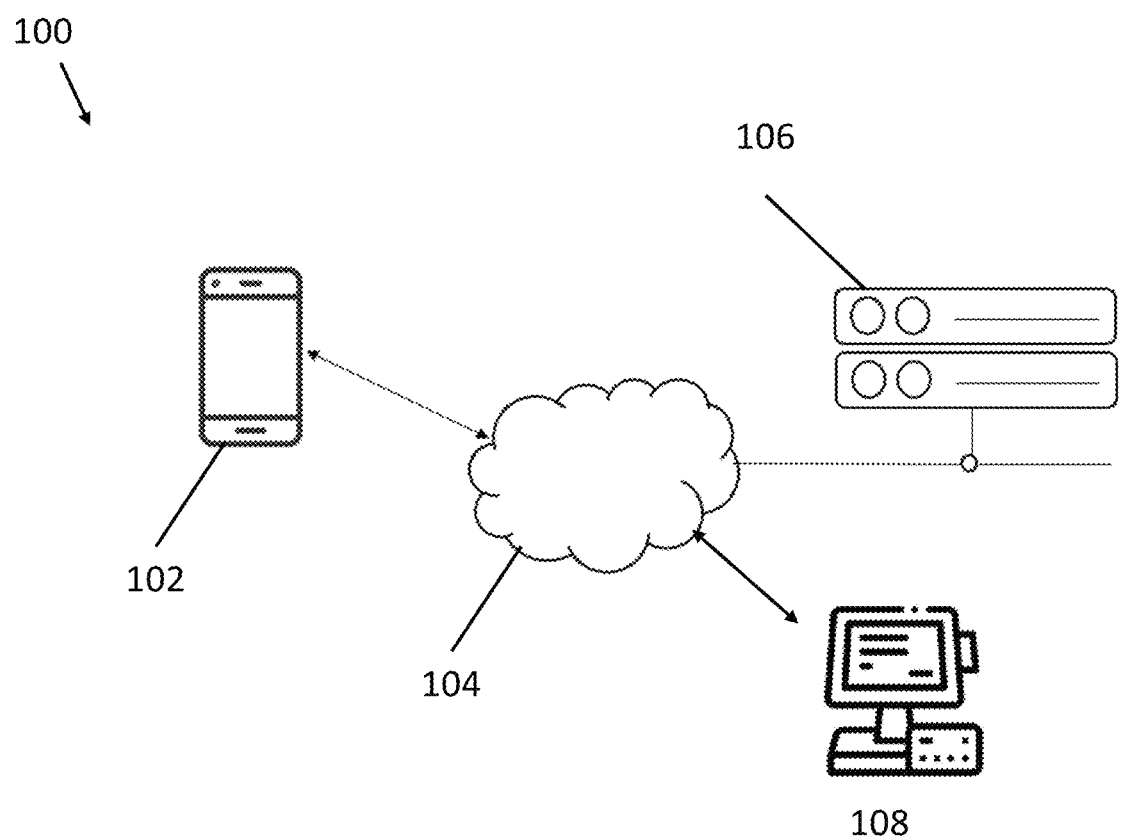
FIG. 1 is a block diagram of an architecture for a location and degree of separation based networking system, according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The present disclosure relates to location based networking and, more particularly, to a device, system, and method for connecting people within the same geographical area with second degree connections.

Referring particularly to FIG. 1, a system 100 for location and degree of separation based networking generally includes a mobile device 102 (e.g., a first user device), a home computer, a server 106, a laptop, and/or a tablet in network communication (e.g., connection via the internet 104) with a second user device 108. The mobile device 102, a home computer, a server 106, a laptop, and/or a tablet may be a general-purpose computer 200 (e.g., a processor), of FIG. 2, configured for network communications. Portions of system 100 may operate as an application for location and degree of separation based networking installed on one user device.

In our lifetime, we come across lifelong business opportunities, friendships, and/or romantic partners which are never realized. In fact, thousands of connections a day never materialize. System 100 provides a technical solution to this problem using a mobile application in which people connect with one another by syncing their contacts, doing the virtual legwork of meeting others. System 100 enables a user the ability to make real world connections with people they would have never met before.

Users running the application on their device(s) allows users to unlock connections in real time. System 100 enables two people who have never met to now connect, based on the fact that system 100 leverages the fact that both users have a third party contact in their phone in common.

System 100 is configured to scan a radius (for example, about a ¼ mile), while refreshing at a predetermined rate (e.g., every minute), matching any and all contacts that two or more users share yet happen to not share contacts between themselves. In aspects of the present disclosure, no connection between users will be made if users share one another's contacts. All contacts on a user's cellphone may be used. The contacts may or may not be weighted in importance and users have the ability to customize whether or not they would like certain contacts to be used over others within the system and application described herein. For example, "User 1" is the user whom "Users 2 and 3" have a shared contact. User 1 is the unbeknownst link that bonds user 2 and user 3. User 1 does not have to have the application installed for the functionality between users 2 and 3 to proceed, as the application, for example may be simply matching liked numbers drawn from user 2 and 3's contact lists. If User 1 does have the application previously installed, they will be notified by system 100. If User 1 does not have the application installed, Users 2 and 3 have the option to invite User 1 to install and join their network. The application may present possible connections to a user, for example, in three ways: push notification, geographical grid highlighting location, and text message.

Although networking is used as an example, it is contemplated that system 100 may be used for any type of networking such as dating, industry conferences, professional meetups and/or mixers, and/or business associations or chambers of commerce.

Figure 2:
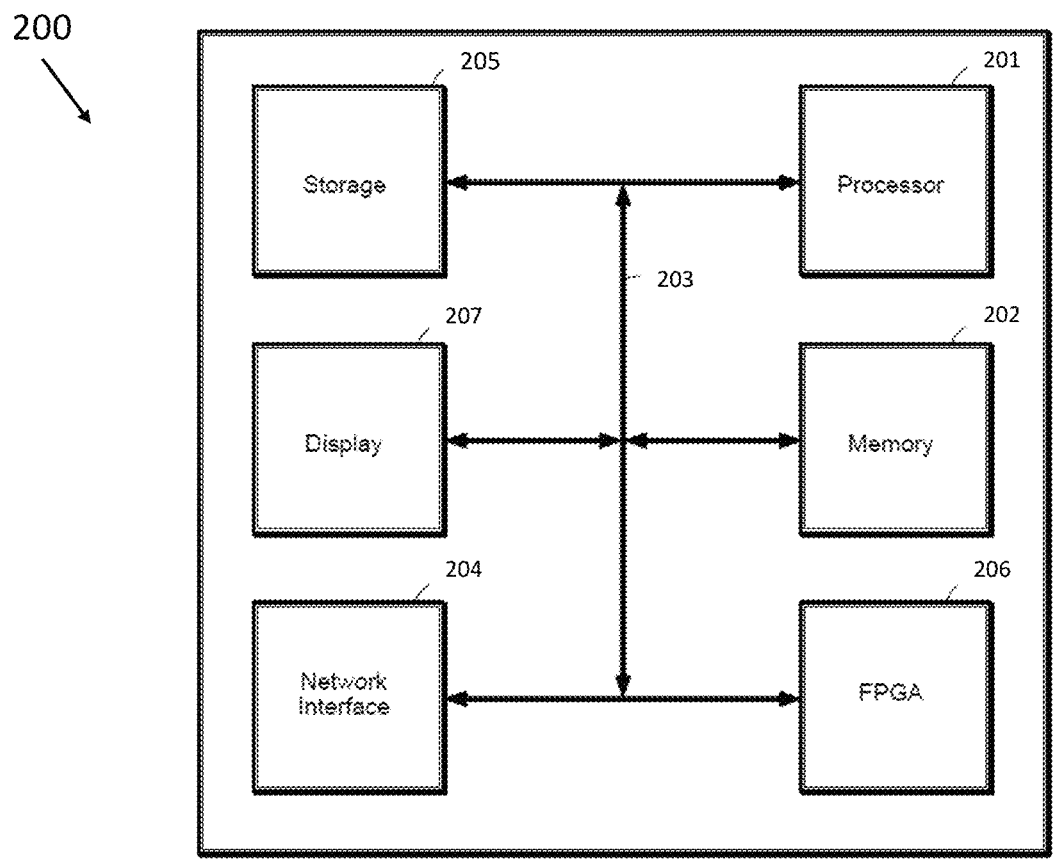
FIG. 2 is a block diagram of an exemplary computer employable by the device, system, and method described herein according to aspects of the present disclosure.

Referring to FIG. 2, the general-purpose computer 200 employable by system 100 is described. The computer 200 may include a processor 201 connected to a computer-readable storage medium or a memory 202 which may be a volatile type memory, e.g., RAM, or a non-volatile type memory, e.g., flash media, disk media, etc. The processor 201 may be another type of processor such as, without limitation, a digital signal processor, a microprocessor, an ASIC, a graphics processing unit (GPU), field-programmable gate array (FPGA), or a central processing unit (CPU). General-purpose computer 200, for example may include a mobile device such as a cell phone or a tablet.

In some aspects of the disclosure, the memory 202 can be random access memory, read-only memory, magnetic disk memory, solid state memory, optical disc memory, and/or another type of memory. The memory 202 can communicate with the processor 201 through communication buses 203 of a circuit board and/or through communication cables such as serial ATA cables or other types of cables. The memory 202 includes computer-readable instructions that are executable by the processor 201 to operate the computer 200 to execute the various functions described herein. The computer 200 may include a network interface 204 to communicate (e.g., through a wired or wireless connection) with other computers or a server. A storage device 205 may be used for storing data. The computer 200 may include one or more FPGAs 206. The FPGAs 206 may be used for executing various functions described herein. A display 207 may be employed to display data processed by the computer 200.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

Figure 3:
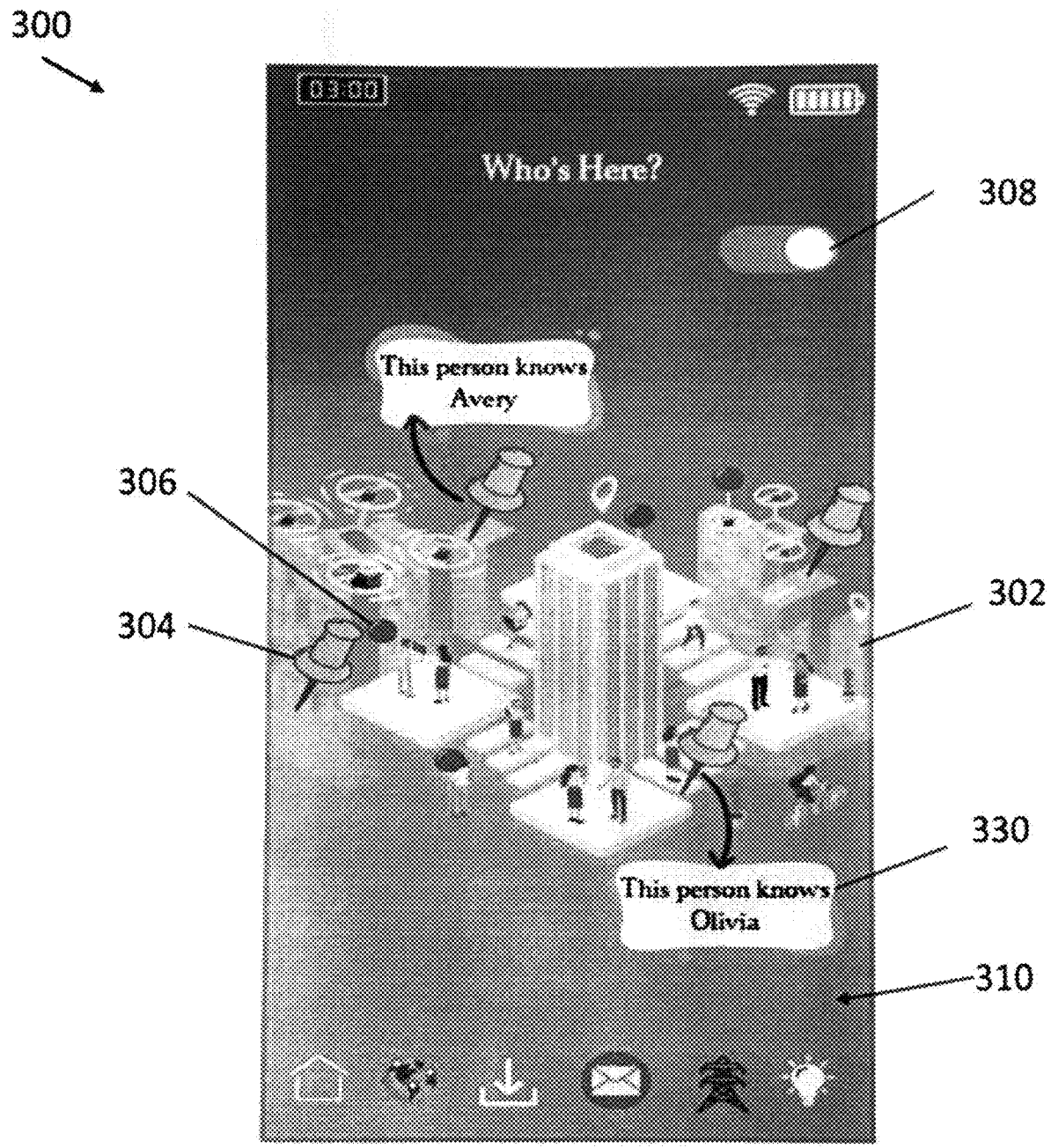
FIG. 3 is an example graphical user interface for the system for location and degree of separation based networking according to aspects of the present disclosure.
Figure 8:
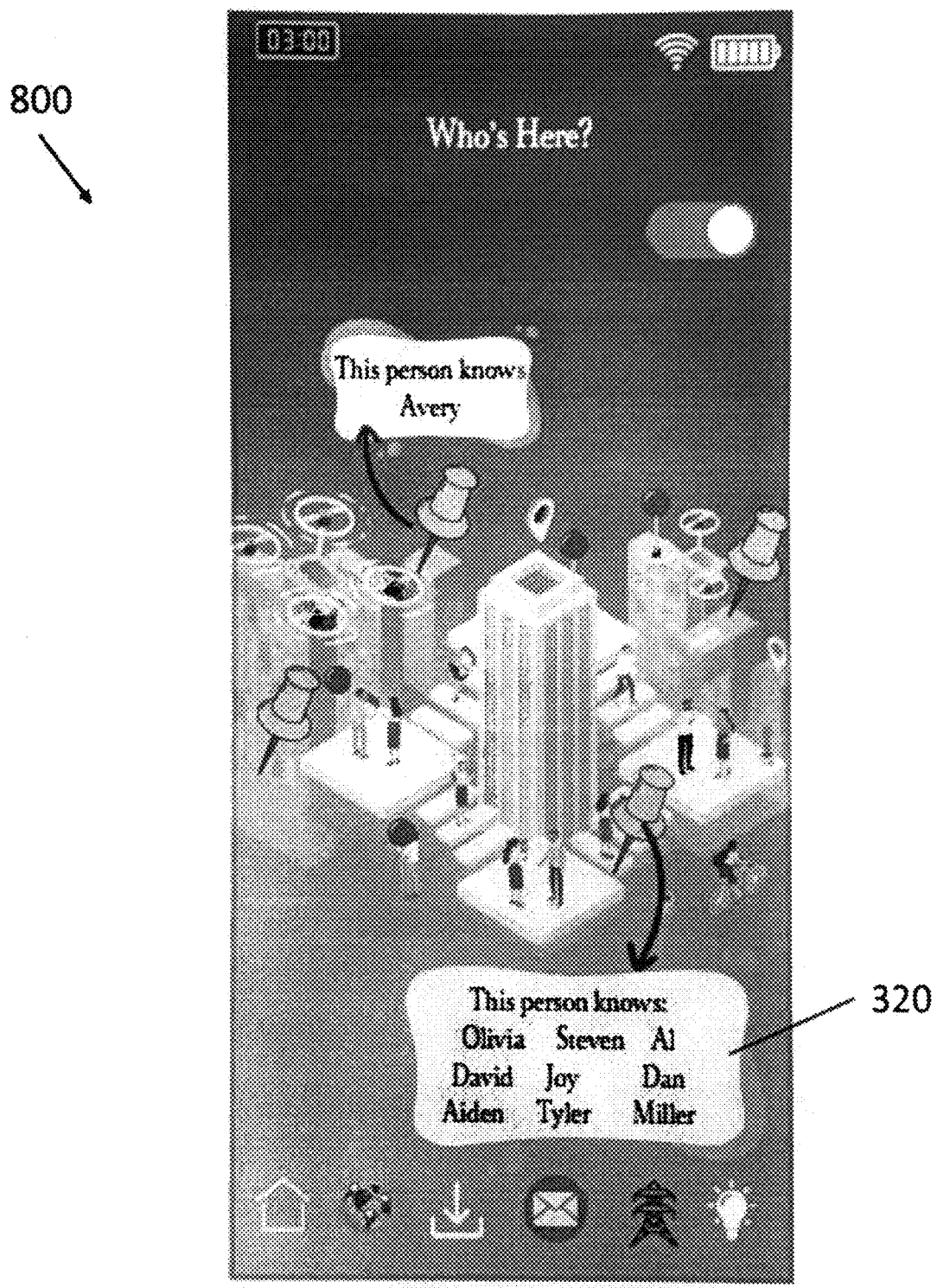
FIG. 8 is an example graphical user interface illustrating a location overview for the system for location and degree of separation based networking according to aspects of the present disclosure.

FIG. 3 is an example graphical user interface (GUI) 300 for system 100 for location and degree of separation based networking according to aspects of the present disclosure. GUI 300 may include a menu bar 310 and a main selection area 302. The main selection area 302 may be a graphical representation of the location, for example, a restaurant, a convention center, or a park. The graphical representation of the location may be based on the radius set by the user. GUI 300 may be configured for receiving a selection based on one or more touch gestures of a user. GUI 300 may include a first type of pin 306 that represents a second user that also uses the application. GUI 300 may include a second type of pin 304 that represents a second user that the user can tap on and see an indication 320 of who the individual has a mutual contact with. One or more names may be displayed based on the number of mutual contacts that the user and the individual have in common (FIG. 8).

When a user taps on second type of pin 304, an indication is displayed to indicate who the individual has a mutual contact with. GUI 300 includes a switch 308 that selectively turns on and off the visualization of the first type of pin 306 and second type of pin 304. In the "off" position, switch 308 may also make the user "invisible" to other users of system 100.

For example, whenever the user taps on the first type of pin 306 the system 100 may share the user's contact with that specific person. If the user feels comfortable enough to introduce himself or herself to the specific person there is the option to send an introductory message through system 100.

Figure 4:
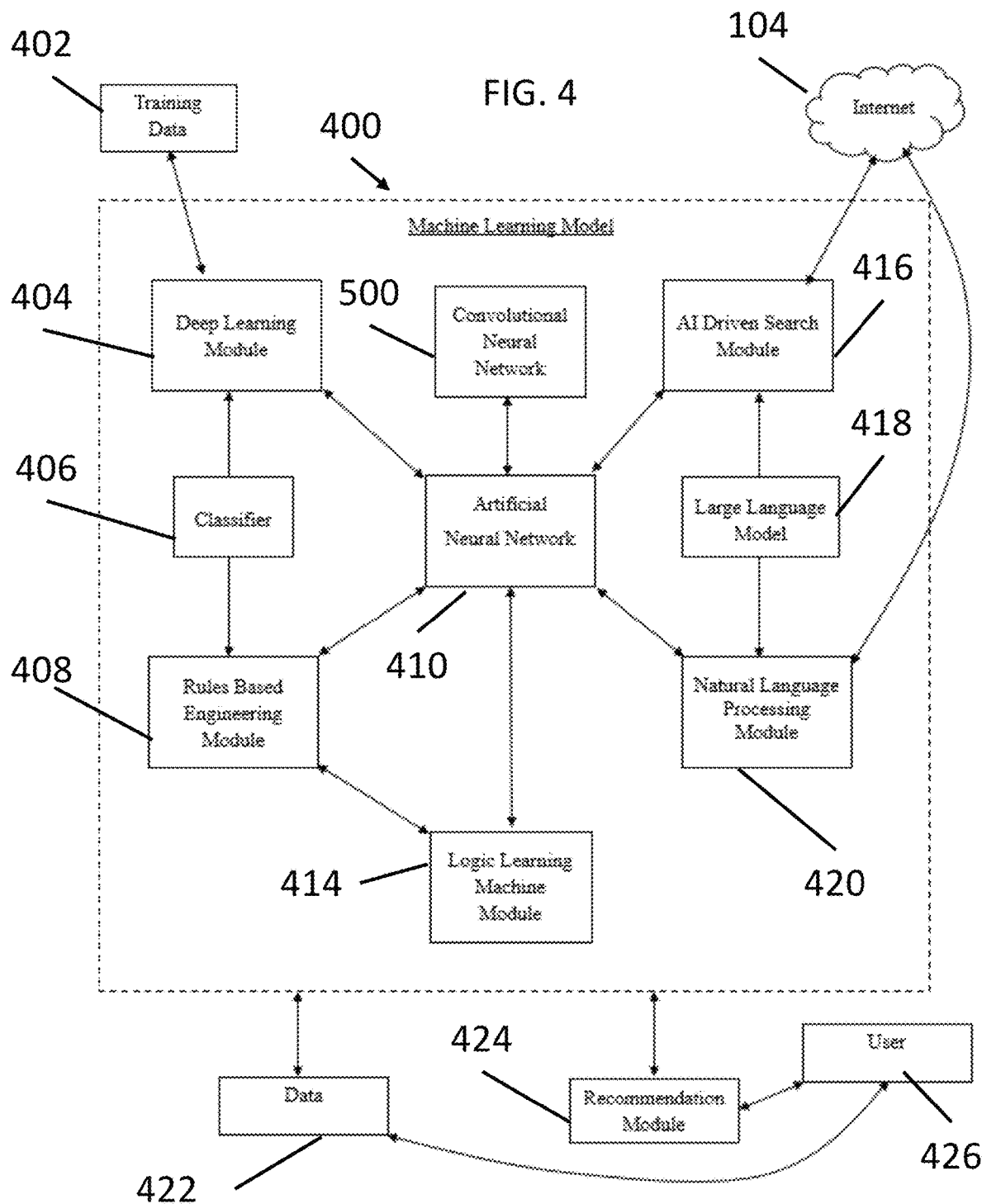
FIG. 4 is a schematic illustration of a machine learning model architecture including an artificial neural network for use with the system of FIG. 1 according to aspects of the present disclosure.

FIG. 4 is a schematic illustration of a machine learning model architecture including an artificial neural network according to aspects of the present disclosure.

The machine learning model 400 may include a deep learning module 404, a classifier 406, a rules-based engineering model 408, and/or a logic learning machine module 414, any of which may be iteratively trained using a training data set, such as a training data set stored in a training data set database (see, e.g., training data database 402).

The machine learning model 400 may include an AI driven search module 416, a large language model 418, and/or a natural language processing module 420, any of which may be selectively connected to the internet 104.

An exemplary description of how each of the AI modules are employed and interact is provided below. In the exemplary context below, the AI modules are being used for the location and degree of separation based networking system 100 using predictive analysis.

The AI driven search module 416 enhances system 100 by dynamically sourcing and integrating external information relevant to the user's contact list. The AI driven search module 416 may filter through material available on the internet to identify and retrieve up-to-date information (e.g., social media posts) to provide possible mutual contacts. The AI driven search module 416 may work in conjunction with the natural language processing 414 and/or the large language model 418 to refine search queries based on the selection of other users.

The large language model 418 may serve a role in enhancing the matching of possible contacts. The large language model 418 can process and interpret natural language, the large language model 418 may generate comprehensive summaries reflecting a user's preferences, utilizing structured data from other system modules like the classifier. The large language model 418 can also refine and improve the prediction of possible contact matches. For example, the large language model 418 may analyze social media to determine a contact match. Furthermore, it may assist in processing and understanding user queries or feedback, facilitating a more interactive and responsive user experience within the location and degree of separation based networking system 100.

The large language model may receive structured data and insights from the deep learning module 404, CNN 500, and artificial neural network 410, which analyze the contacts. The large language model 418 uses this information to generate recommendations that may not have been determined using merely the user's contact list on their device. In collaboration with the AI-driven search module 416, it helps to incorporate relevant, up-to-date information from all of a user's interactions with system 100, ensuring the recommendations remain current and accurate. Moreover, inputs from the rules-based engineering module 408 and the logic learning machine module 414 enable the large language model 418 to adhere to predetermined logic and patterns, ensuring the generated recommendations are accurate contact matches.

The natural language processing module 420 may play a role in understanding and generating human language, enabling the system to process and interpret user inputs, feedback, and textual content within the system and enables the conversation experience to lead to efficient networking fulfilment. The natural language processing module 420 may analyze the structured data provided by modules like the convolutional neural network 500 and the deep learning module 414, extracting meaningful insights.

The natural language processing module 420 enhances its functionality through interactions with various other modules, ensuring a robust integration of language understanding and generation capabilities. The natural language processing module 420 works closely with the large language model 418 to refine the generated response, utilizing the large language model's extensive database of language patterns to produce contextually relevant and coherent text. The natural language processing module 420 also processes and interprets data from the deep learning module 404 and the convolutional neural network 500, translating intricate patterns and visual insights into descriptive textual elements that add depth and detail to the response and potentially provide recommendations to the user. In collaboration with the AI-driven search module 416, the natural language processing module 420 optimizes search queries to source the most relevant information. The classifier's 406 categorizations guide the natural language processing module 420 in tailoring the textual content to align with the generated response, ensuring a high degree of personalization. Furthermore, the natural language processing module 420 applies the structured data and logical frameworks developed by the rules-based engineering module 408 and the logic learning machine module 414 to apply consistent linguistic standards and adapt the user's recommendation to reflect logical deductions, maintaining both clarity and relevance.

The machine learning model 400 may also include a convolutional neural network (CNN) 500. In particular, the CNN 500 can be employed to perform the video analysis described herein based parsing reviews, interactions, and/or data, and recommendations may be made to the user via the recommendation module. Video analysis may be leveraged by the CNN 500 to analyze frames to identify and track faces over time. By aggregating these detections, the system can determine which individuals frequently appear together, suggesting possible mutual contacts. For example, the CNN 500 may be used to analyze images and videos stored on any of the devices (e.g., user devices such as smartphones). By leveraging facial recognition, the system can cross-reference detected faces with the user's contact list, highlighting mutual connections and suggesting new contacts based on visual data. In aspects of the present disclosure, CNN 500 may match faces by detecting and extracting key features from images through multiple layers, starting from simple edges to complex facial structures. CNN 500 then may generate a compact numerical representation (embedding) for each face, capturing its unique characteristics. These embeddings are compared using a distance metric, such as Euclidean distance, to determine matches.

Figure 5:
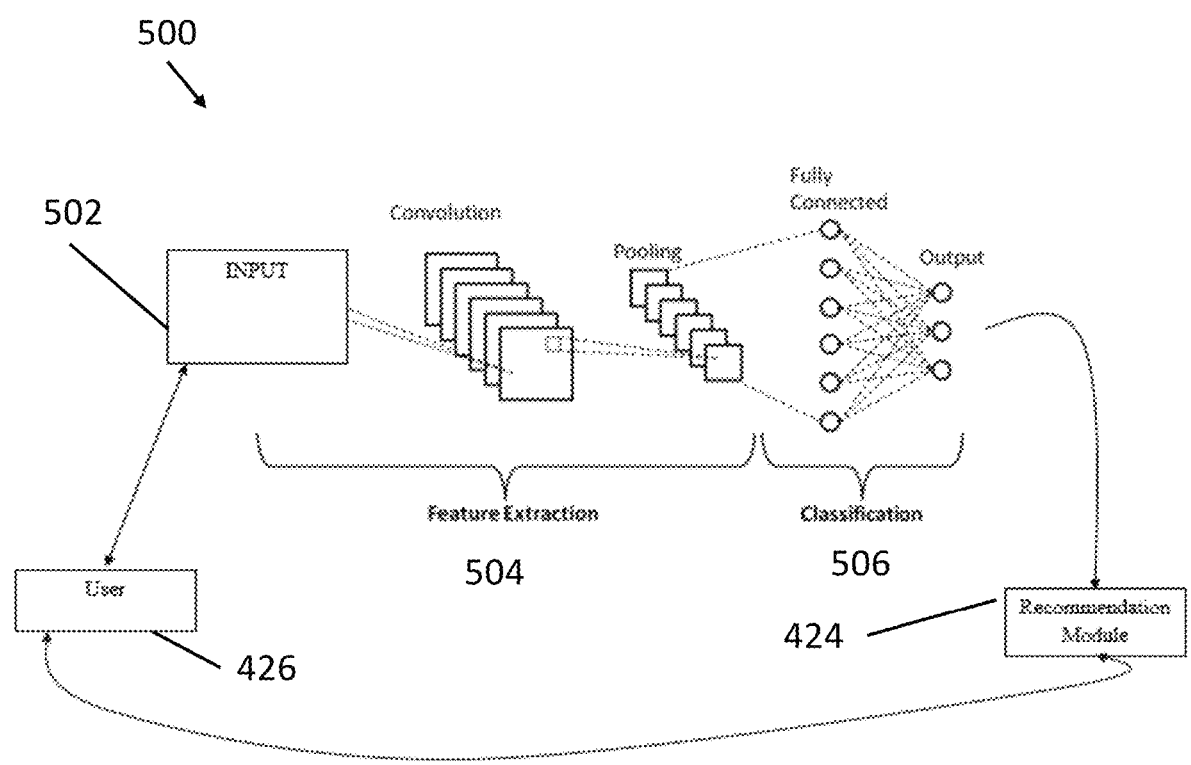
FIG. 5 is a schematic illustration of a convolutional neural network employable by the machine learning model of FIG. 4 according to aspects of the present disclosure.

FIG. 5 is a schematic illustration of a convolutional neural network (CNN) employable by the machine learning model 400 of FIG. 4 according to aspects of the present disclosure.

In CNNs feature extraction 504 is the process of automatically identifying relevant patterns or features from input data, often through convolutional layers. These layers consist of filters or kernels that slide over the input data, such as images, extracting features such as edges, textures, or shapes. Each filter performs a mathematical operation on the input data, producing feature maps that highlight different aspects of the image. Through the training process, the CNN 500 learns to adjust the parameters of these filters to extract increasingly complex and meaningful features from the data.

Pooling is a down sampling technique commonly applied after feature extraction in the CNN 500. Pooling layers reduce the dimensionality of the feature maps by summarizing the information within local regions. The most common pooling operation is max pooling, where the maximum value within each region is retained while discarding the rest. This process helps to make the learned features more invariant to small variations in the input, reducing computational complexity and preventing overfitting. By iteratively applying feature extraction and pooling layers, the model can hierarchically learn to represent the input data in a way that is conducive to solving the target task, such as image classification or object detection.

Following feature extraction and pooling, the output is typically fed into one or more fully connected layers in the CNN 500, which serve as classifiers 506. These layers take the high-level features extracted from the previous layers and map them to the target classes or categories. During training, the parameters of these layers are optimized through techniques like backpropagation and gradient descent, minimizing the difference between the predicted class probabilities and the actual labels in the training data. In the case of classification tasks, the final layer often employs a SoftMax activation function to produce a probability distribution over the possible classes, allowing the model to make predictions by selecting the class with the highest probability. By leveraging feature extraction, pooling, and classification in conjunction, the CNN 500 can effectively learn to recognize and classify patterns in complex data such as images, text, or audio.

For example, based on user contact data, the CNN 500 will generate an output for a user 426 by employing the recommendation module 424. The recommendation module may be trained on data 422, such as training data stored in a database. The recommendation module 424 can then analyze this output to determine the possible contact matches and suggest the matches.

Figure 6:
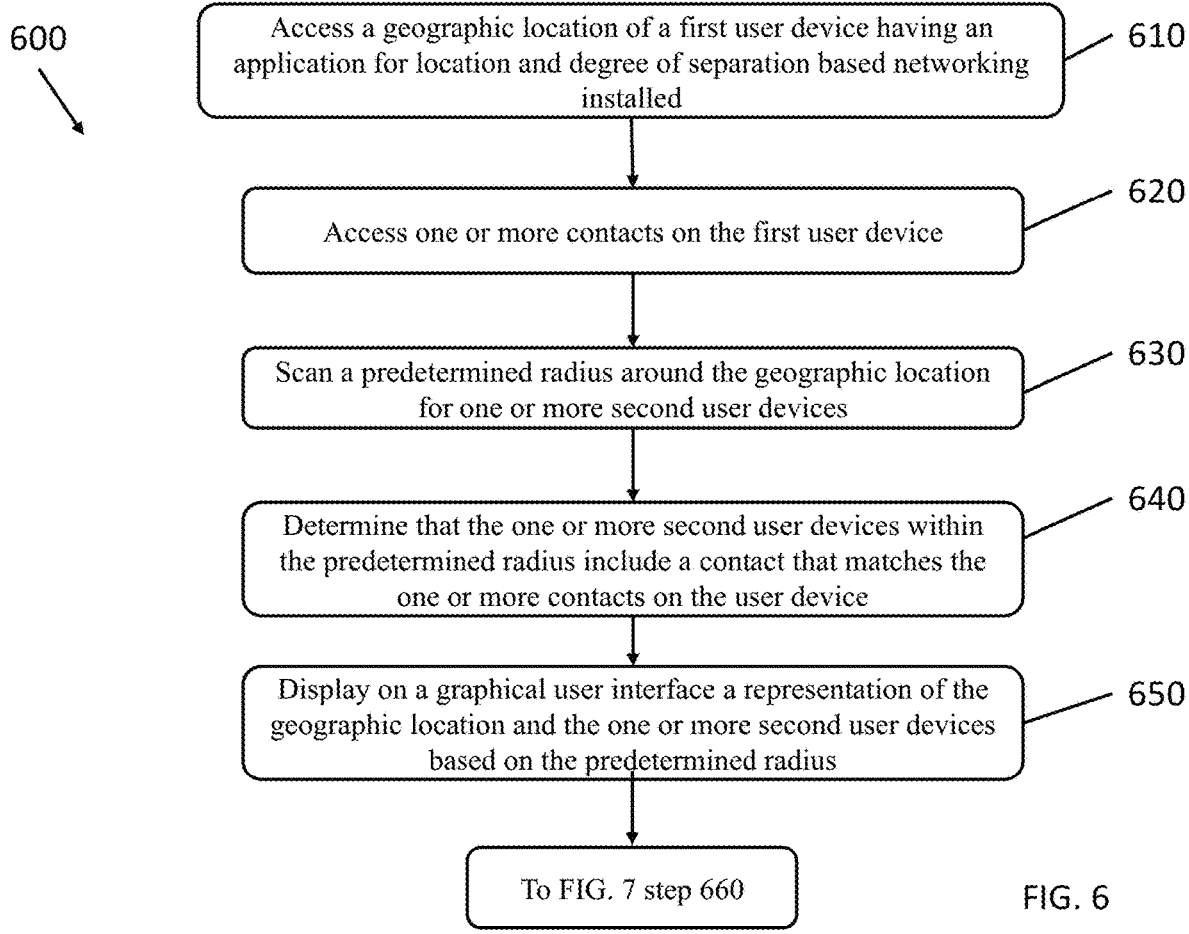
FIGS. 6 and 7 are flow charts for a method for location and degree of separation based networking according to aspects of the present disclosure.
Figure 7:
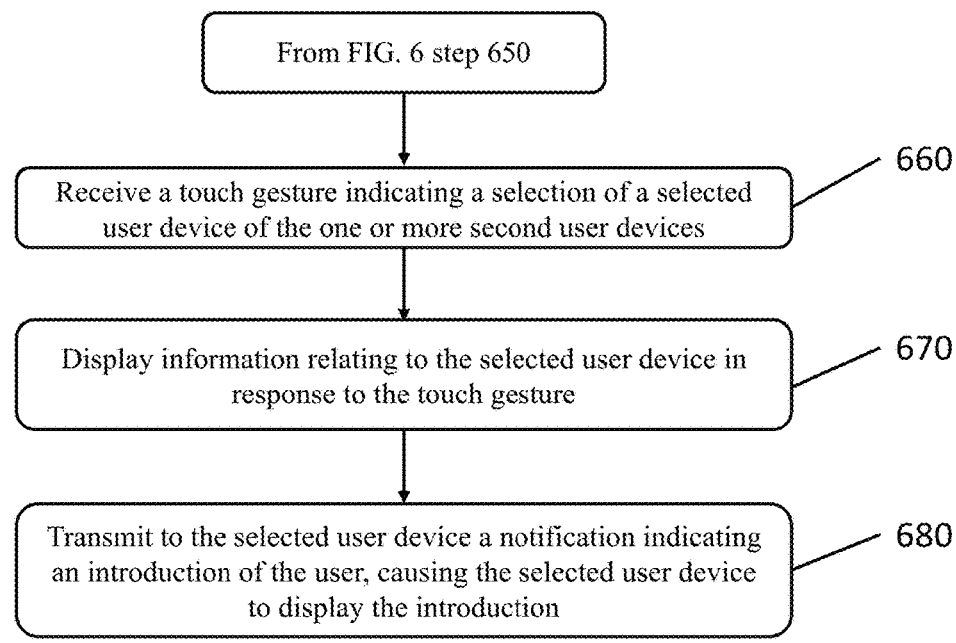

With reference to FIGS. 6 and 7, a method 600 for location and degree of separation based networking using system 100 of FIG. 1 is shown. The method 600 may be performed by the processor 200 of FIG. 2. Portions of the method 600 may be performed by a separate device, such as a server. Interactions between a user and system 100 may be performed using a graphical user interface 300, such as the ones depicted in FIGS. 3 and 8-10. System 100 provides the benefit of enabling a user to network with people that they likely have a person that they know in common, thereby solving the issue of meeting people that a user does not know. System 100 allows a user to make real time interactions with individuals who they share a common friend, but where the two people happen to never have met before.

In aspects of the present disclosure, system 100 may include a GUI where a user can enable location services, contacts, and can select a subset of contacts for use with system 100. System 100 may include user preferences, where a user can input occupation and/or interests.

At step 610, the processor causes system 100 to access a geographic location of a first user device having an application for location and degree of separation based networking installed. For example, system 100 may utilize GPS, Wi-Fi, and/or cellular network data to determine the device's geographic coordinates. GPS (Global Positioning System) uses signals from satellites to calculate precise location coordinates outdoors. Wi-Fi positioning leverages nearby Wi-Fi access points and their signal strengths to estimate location, especially indoors where GPS signals may be weaker. Cellular network positioning utilizes information from nearby mobile towers to approximate the device's location based on signal triangulation. System 100 may combine these methods (known as Assisted GPS or A-GPS) to achieve accurate and reliable location data for functionalities like mapping, navigation, local search, and targeted content delivery based on the user's location.

At step 620, the processor causes system 100 to access one or more contacts on the first user device. The one or more contacts include contact information, including, for example, phone numbers, email addresses, and/or one or more personal details. For example, a contact on the first user device typically includes essential details like the contact's name, phone number, email address, and physical address. Additional information such as job title, company name, and birthdays may also be stored. Custom fields allow users to add specific notes or preferences, while some contacts may feature profile pictures and communication history, including calls, messages, and emails exchanged with the contact. It is contemplated that any contact data may be used as an input, for example, for machine learning model 400.

At step 630, the processor causes system 100 to scan a predetermined radius around the geographic location for one or more second user devices. For example, system 100 can scan a predetermined radius around its geographic location by utilizing its built-in capabilities such as Bluetooth, Wi-Fi, or GPS. For instance, Bluetooth Low Energy (BLE) allows devices to scan for nearby devices within a specified range, for example, up to 100 meters, by detecting signals emitted by other Bluetooth-enabled devices. For example, Wi-Fi scanning involves detecting Wi-Fi signals from nearby devices or access points, leveraging signal strength to estimate proximity. In aspects of the present disclosure, GPS may be used to pinpoint the device's exact location and determine distances to other devices based on their GPS coordinates.

At step 640, the processor causes system 100 to determine that the one or more second user devices within the predetermined radius include a contact that matches the one or more contacts on the user device. System 100 may determine if one or more second user devices within a predetermined radius include a contact that matches those on the user's device through several methods. For example, in a case where both devices are running the application, system 100 may cause the devices to exchange unique identifiers or tokens between devices using Bluetooth, Wi-Fi, or another communication protocol. These identifiers can represent a user's contact information securely and privately. The application may then compare received identifiers with contacts stored locally on the user's device. If a match is found, the app can notify the user that a familiar contact is nearby without revealing specific contact details to ensure privacy and security. This enables personalized interactions or notifications based on proximity to known contacts, enhancing user experience in location-aware scenarios. In another example, system 100 may use machine learning for contact matching with variations in spelling. For example, system 100 may preprocess contact names by standardizing formats and extracting features like tokens or phonetic representations. System 100 may then calculate similarity using metrics such as Levenshtein distance or Jaccard similarity to measure how closely names from different devices match. The Levenshtein distance between two words is the minimum number of single-character edits (insertions, deletions or substitutions) required to change one word into the other. A similarity threshold may be applied to determine which names are considered matches, allowing the app to confidently link contacts with slightly different spellings (e.g., "John" and "Juan"). This approach ensures accurate contact matching across devices despite discrepancies in name spelling or formatting.

At step 650, the processor causes system 100 to display on a graphical user interface (FIG. 3) a representation of the geographic location and the one or more second user devices based on the predetermined radius.

At step 660, the processor causes system 100 to receive a touch gesture indicating a selection of a selected user device of the one or more second user devices. For example, system 100 receives a touch gesture to select a graphic representing proposed contact, the touchscreen detects the location and movement of the user's finger. For example, capacitive sensors in the touchscreen register changes in electrical charge caused by the touch, identifying the exact coordinates of the gesture. This interaction allows users to navigate through graphical interface seamlessly, enabling intuitive selection and interaction with displayed content.

At step 670, the processor causes system 100 to display information relating to the selected user device in response to the touch gesture. For example, the information relating to the selected user device may be an indication 320 (FIG. 3) such as "This person knows Olivia."

At step 680, the processor causes system 100 to transmit to the selected user device a notification indicating an introduction of the user (FIG. 9), causing the selected user device to display the introduction.

In aspects of the present disclosure, the processor may cause system 100 to store data gathered during the user dining experiences within a database for use in providing recommendations. In aspects of the present disclosure, the processor may cause system 100 to predict, by a machine learning network, one or more recommended contacts based on similar contacts.

For example, a user walks into a coffee shop alone. The user sits down at a table and into the coffee shop walks another individual the user has never met before. A notification pops up on both the device of the user and of the individual, informing the user and/or the individual that they have a mutual contact (e.g., a mutual friend or colleague). However, that friend is not in the same state or location as the user and the individual. For example, this third party friend is currently living in California. For example, the notification may then ask "would you like to connect? (Yes/No)" The third party may also be notified. The user and this individual are close to connecting. It is now the user's choice if they want to make the connection or not. In aspects of the present disclosure the third party has the choice to help the user along.

Meeting new people should be a choice, not a requirement. Accordingly, a user can always accept or decline trusted notifications from system 100 when sent to the user's device.

Figure 10:
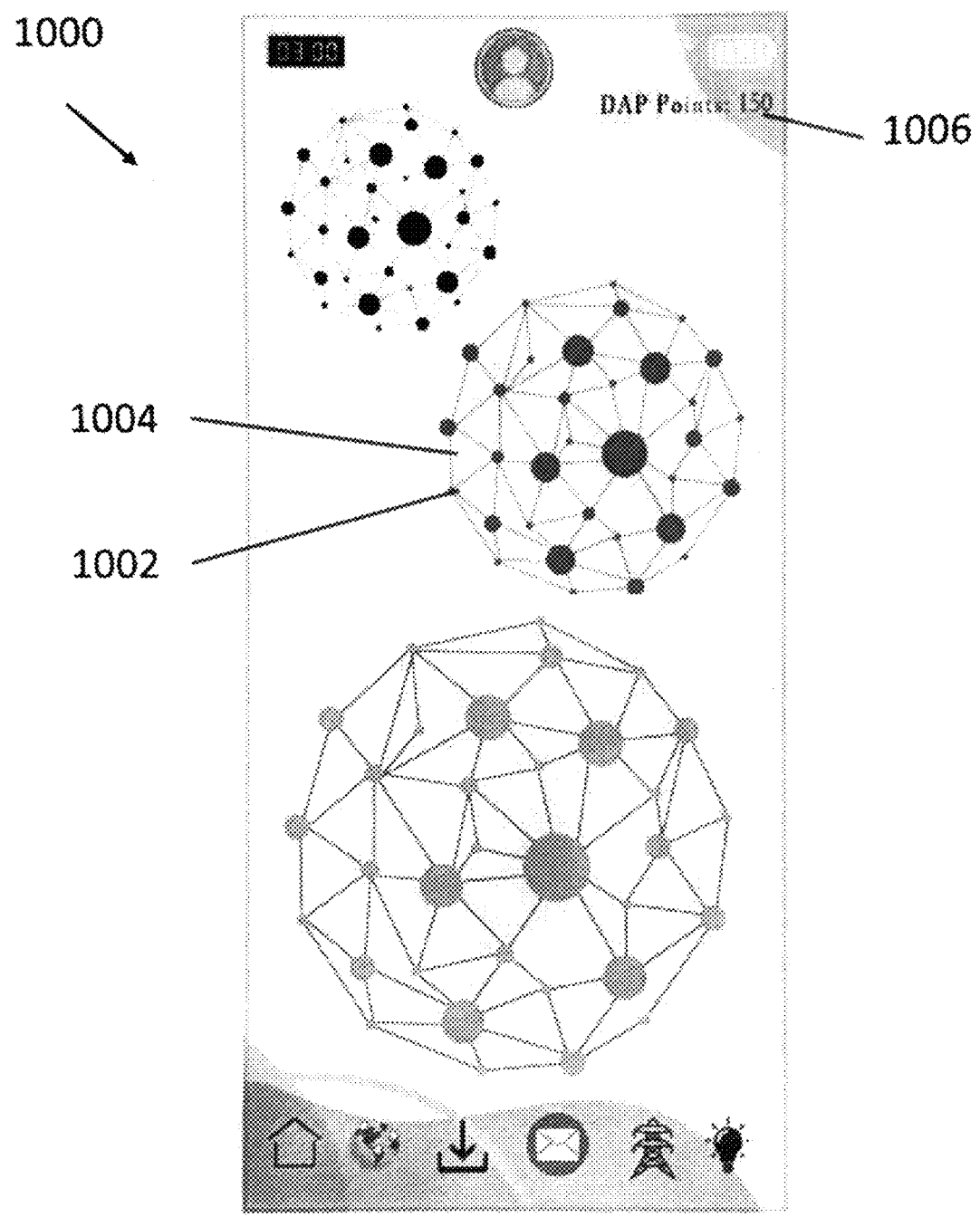
FIG. 10 is an example graphical user interface for showing points, according to aspects of the present disclosure.

In aspects of the present disclosure, system 100 enables a user to collect points 1006 (FIG. 10). For example, by accepting a suggested contact a user may get points. The more people a user connects with, the more points they collect. For example, once a user "accepts" the new friend they may collect points. In aspects of the present disclosure, if a user decides to leave or delete the application from their device the points originally collected will disappear after an amount of time. In aspects of the present disclosure, system 100 may provide a user the ability to block contacts.

In aspects of the present disclosure, system 100 may include a workspace (e.g., plaza) where users that connect can collaborate on work, projects, etc. and build on new relationships and professional business.

Referring to FIG. 8, an example location overview GUI 800 for use with system 100 of FIG. 1 is shown. When a user wants to see what other prospective contacts are nearby, for example in step 650 of FIG. 6, GUI 800 may be displayed. GUI 800 provides the user additional information about the location and the prospective contacts, such as "this person knows Dave."

Figure 9:
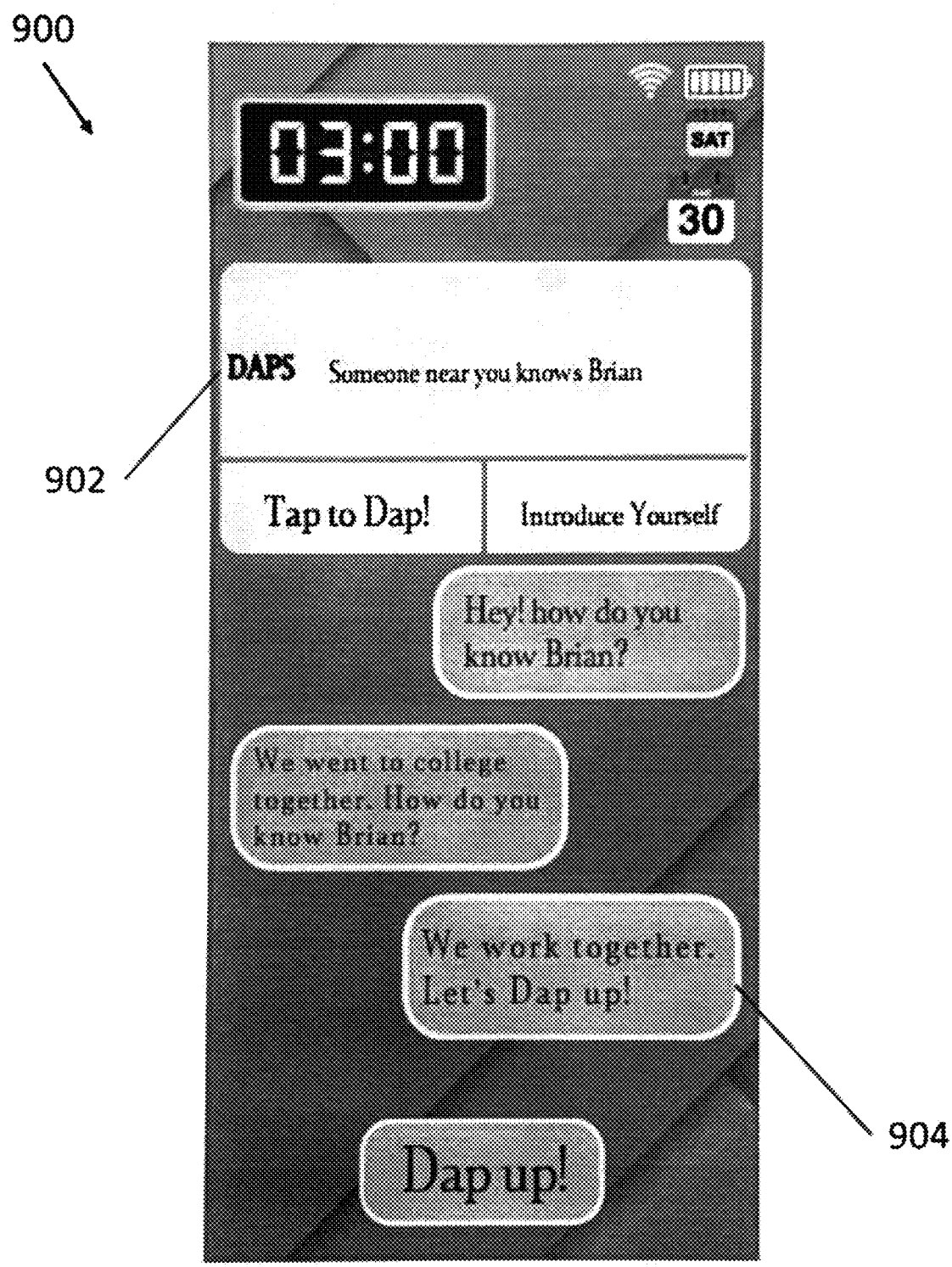
FIG. 9 is an example graphical user interface showing a notification and chat screen for the system for location and degree of separation based networking according to aspects of the present disclosure.

Referring to FIG. 9, an example chat GUI 900 for use with system 100 of FIG. 1 is shown. After steps 670 and 680 of FIG. 7, GUI 900 may be displayed to enable a chat session 904 between the connected users. GUI 900 may further include an indication 902 that someone nearby has a common contact. GUI 900 may be displayed on a lock screen of a user device, or within the application.

For example, after step 640 of FIG. 6, GUI 900 may provide an indication that someone near the user knows a common contact named Brian. GUI 900 may display a message letting the user know "Someone near you knows Brian." GUI 900 may further display Would you like to connect?" or "Introduce yourself." The user may click on "Introduce yourself" and step 670 of FIG. 7 would occur.

Referring to FIG. 10, an example GUI 1000 for showing graphical connections and points for use with system 100 of FIG. 1 is shown. GUI 1000 generally includes a plurality of globes 1004 that are graphic representations illustrating connections that a user has made and the number of points 1006 earned. The globes 1004 are selectable by a user. A user can also click on the nodes 1002 to explore the connections and display additional information about the contacts. The globes 1004 include nodes 1002 that represent connections. For example, the nodes 1002 (e.g., globe connections) may appear by showing who connected because of a connection such as "Jake."

In aspects of the present disclosure, color coding or different node sizes may be used to denote the frequency or strength of shared contacts, providing visual context. For example, green may denote a contact that there are many interactions with and pink may represent a contact that there are few interactions with. In aspects of the present disclosure, user interaction features might include zooming in/out, rotating the globe, and tapping on nodes for detailed contact information.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for location and degree of separation based networking, comprising:
   a processor; and
   a memory, including instructions stored thereon, which, when executed by the processor, cause the system to:
   access a geographic location of a first user device having an application for location and degree of separation based networking installed;
   access one or more contacts on the first user device, wherein the one or more contacts include contact information, including at least one of phone numbers, email addresses, or one or more personal details;
   scan a predetermined radius around the geographic location for one or more second user devices;
   determine that the one or more second user devices within the predetermined radius include a contact that matches the one or more contacts on the user device, wherein contact matching includes:
   determining by a machine learning model a first similarity score for matching with variations in spelling:
   calculating a second similarity score using metrics including at least one of a Levenshtein distance or Jaccard similarity to measure how closely contacts from the one or more second user devices match the one or more contacts on the first user device; and
   determining which names are considered matches based on the first and second similarity score;
   display on a graphical user interface a representation of the geographic location and the one or more second user devices based on the predetermined radius;
   receive a touch gesture indicating a selection of a selected user device of the one or more second user devices;
   display information relating to the selected user device in response to the touch gesture; and
   transmit to the selected user device a notification indicating an introduction of the user, causing the selected user device to display the introduction.

2. The system of claim 1, wherein the instructions, when executed by the processor, further cause the system to:

filter one or more contacts to reduce an amount of contacts that may be used for the determination that the one or more second user devices within the predetermined radius include the contact,
wherein the filtering is based on a user setting for filtering whether or not the user would like certain contacts to be used over others within application.

3. The system of claim 2, wherein the instructions, when executed by the processor, further cause the system to:
store data gathered during the scanning and the determination within a database for use in providing recommendations.

4. The system of claim 1, wherein the instructions, when executed by the processor, further cause the system to:
determine if the selected user device has the application installed; and
provide the notification by the installed application on the selected user device.

5. The system of claim 4, wherein the user of the first user device and a user of the selected device different than the user of the first user device, do not know each other.

6. The system of claim 1, wherein the instructions, when executed by the processor, further cause the system to:
determine that more than one contact is in common between the first user device and the one or more second user devices; and
display information on the graphical user interface based on the determination.

7. The system of claim 1, wherein the notification includes at least one of a push notification, a geographical grid highlighting location, or a text message.

8. The system of claim 7, wherein the scanning is performed using at least one of GPS data, WIFI data, or Bluetooth data.

9. The system of claim 1, wherein the instructions, when executed by the processor, further cause the system to:
receive an acceptance of the invitation; and
initiate a chat session between the selected user device and the first user device based on the acceptance.

10. The system of claim 9, wherein one or more second user devices do not have the application installed.

11. A computer-implemented method for location and degree of separation based networking, comprising:
accessing a geographic location of a first user device having an application for location and degree of separation based networking installed;
accessing one or more contacts on the first user device, wherein the one or more contacts include contact information, including at least one of phone numbers, email addresses, or one or more personal details;
scanning a predetermined radius around the geographic location for one or more second user devices;
determining that the one or more second user devices within the predetermined radius include a contact that is the one or more contacts on the user device, wherein contact matching includes:
determining by a machine learning model a first similarity score for matching with variations in spelling:
calculating a second similarity score using metrics including at least one of a Levenshtein distance or Jaccard similarity to measure how closely contacts from the one or more second user devices match the one or more contacts on the first user device; and
determining which names are considered matches based on the first and second similarity score;
displaying on a graphical user interface a representation of the geographic location and the one or more second user devices based on the predetermined radius;
receiving a touch gesture indicating a selection of a selected user device of the one or more second user devices;
displaying information relating to the selected user device in response to the touch gesture; and
transmitting to the selected user device a notification indicating an introduction of the user, causing the selected user device to display the introduction.

12. The computer-implemented method of claim 11, further comprising:
filtering one or more contacts to reduce an amount of contacts that may be used for the determination that the one or more second user devices within the predetermined radius include the contact,
wherein the filtering is based on a user setting for filtering whether or not the user would like certain contacts to be used over others within application.

13. The computer-implemented method of claim 12, further comprising:
storing data gathered during the scanning and the determination within a database for use in providing recommendations.

14. The computer-implemented method of claim 11, further comprising:
determining if the selected user device has the application installed; and
providing the notification by the installed application on the selected user device.

15. The computer-implemented method of claim 14, wherein the user of the first user device and a user of the selected device different than the user of the first user device, do not know each other.

16. The computer-implemented method of claim 11, further comprising:
determining that more than one contact is in common between the first user device and the one or more second user devices; and
displaying information on the graphical user interface based on the determination.

17. The computer-implemented method of claim 11, wherein the notification includes at least one of a push notification, a geographical grid highlighting location, or a text message.

18. The computer-implemented method of claim 17, wherein the scanning is performed using at least one of GPS data, WIFI data, or Bluetooth data.

19. The computer-implemented method of claim 11, further comprising:
receiving an acceptance of the invitation; and
initiating a chat session between the selected user device and the first user device based on the acceptance.

20. A non-transitory computer readable medium, storing instructions for executing a computer-implemented method for location and degree of separation based networking, the method comprising:
accessing a geographic location of a first user device having an application for location and degree of separation based networking installed;
accessing one or more contacts on the first user device, wherein the one or more contacts include contact information, including phone numbers, email addresses, or one or more personal details;
scanning a predetermined radius around the geographic location for one or more second user devices;

determining that the one or more second user devices within the predetermined radius include a contact that is the one or more contacts on the user device, wherein contact matching includes:
- determining by a machine learning model a first similarity score for matching with variations in spelling;
- calculating a second similarity score using metrics including at least one of a Levenshtein distance or Jaccard similarity to measure how closely contacts from the one or more second user devices match the one or more contacts on the first user device; and
- determining which names are considered matches based on the first and second similarity score;

displaying on a graphical user interface a representation of the geographic location and the one or more second user devices based on the predetermined radius;

receiving a touch gesture indicating a selection of a selected user device of the one or more second user devices;

displaying information relating to the selected user device in response to the touch gesture; and transmitting to the selected user device a notification indicating an introduction of the user, causing the selected user device to display the introduction.

* * * * *